INVENTORS
Manfred Börner &
Hans Schüssler

BY

Spencer & Kaye
ATTORNEYS

INVENTORS
Manfred Börner &
Hans Schüssler
BY Spencer & Kaye
ATTORNEYS

INVENTORS
Manfred Börner &
Hans Schüssler
BY Spencer & Kaye
ATTORNEYS

United States Patent Office 3,437,848
Patented Apr. 8, 1969

3,437,848

PIEZOELECTRIC PLATE FILTER

Manfred Börner, Ulm (Danube), and Hans Schüssler, Beimerstetten, Germany, assignors to Telefunken Patentverwertungs-G.m.b.H., Ulm (Danube), Germany Filed Sept. 23, 1965, Ser. No. 489,614
Claims priority, application Germany, Sept. 24, 1964, T 27,072
Int. Cl. H02n *1/00, 7/00*
U.S. Cl. 310—8.2 10 Claims

ABSTRACT OF THE DISCLOSURE

A crystal resonator in the form of a plate of a single piece having two electrodes on each side thereof the electrodes on the same side being electrically separated from each other. Zones of smaller depth and thus having smaller cross sections than the cross sections of the plates are provided by means of recesses in the plate in order to provide at least one crystal zone which separates the electrodes on the same side of the plate from each other. In one embodiment the recesses not only are provided transverse to the longitudinal axis of the resonator but also parallel thereto in order to provide for a particular type of desired coupling.

Figure 1A:
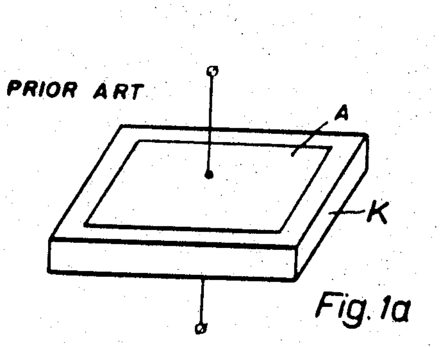

The present invention relates to a piezoelectric resonator arrangement, comprising a plate-like crystal resonator having at least two electrodes in the form of electrically conductive surface coatings provided on each face of the crystal, the electrodes being separated from each other by variations in the cross section of the crystal.

Piezoelectric resonator arrangements generally comprise crystal resonators of quartz, tourmaline or Rochelle salt and are used as frequency dependent impedances for frequency stabilization in oscillator circuits or in filter circuits. Quartz plates having circular or rectangular cross sections are generally provided with gold or silver electrodes on each face of the plate in the form of vapor-deposited surface coatings. If several electrodes are provided on each face, these electrodes are usually separated by recesses provided in the narrow sides of the quartz plate with the separated regions being only weakly connected by a narrow cross piece. Since the resonance frequency of the quartz plates is adjusted by changing the electrical properties of the plate, the adjustment, for precision adjusting reasons, is effected by varying the amount of the vapor-deposited metal coating. The coating must also be applied to those crystal regions wherein the geometric change results in a defined change in the resonance frequency of the quartz plate in order to obtain a favorable electromechanical coupling factor. If the resonance frequency of the quartz has to be very stable, i.e., with very little drift, the application of the metal coating has to be performed very carefully. In the conventional piezoelectric resonator arrangements, this results in great difficulties, and these known arrangements have heretofore not met the requirement of an extremely good long-time stability for a quartz resonator.

It is an object of the present invention to provide a piezoelectric resonator arrangement comprising a crystal resonator having long-term frequency stability.

It is another object of the present invention to provide a piezoelectric resonator arrangement which is relatively independent of the electromechanical characteristics of the surface coatings which function as electrodes.

According to the present invention, there is provided a piezoelectric resonator arrangement having a plate-like crystal, wherein at least one crystal region without electrodes is provided between the crystal regions having electrodes thereon and which are excited by thickness or thickness shear vibrations. The crystal region without electrodes is separated from the other crystal regions by zones that have a different plate thickness. These zones, which are small in comparison to the crystal regions and which have a different cross section, can be produced either by decreasing or increasing the cross section of the crystal plate. These zones serve for decoupling the individual crystal regions and provide, in contradistinction to conventional decoupling devices, a uniform vibration behavior along the entire narrow separation zone between two adjacent crystal regions, when the crystal resonator is excited for thickness or thickness shear vibrations.

Additional objects and advantages of the present invention will become apparent upon consideration of the following description when taken in conjunction with the accompanying drawings in which:

FIGURE 1*a* is a perspective view of a prior art resonator arrangement.

Figure 1B:
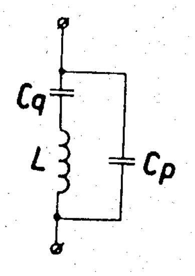

FIGURE 1*b* is a circuit diagram of the electrical equivalent of FIGURE 1*a*.

Figure 2A:
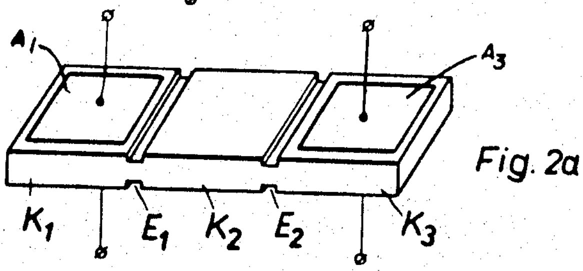

FIGURE 2*a* is a perspective view of an embodiment of a piezoelectric resonator arrangement according to the present invention.

Figure 2B:
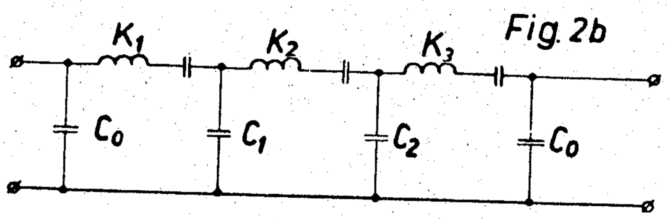

FIGURE 2*b* is a circuit diagram of the electrical equivalent of FIGURE 2*a*.

Figure 2C:
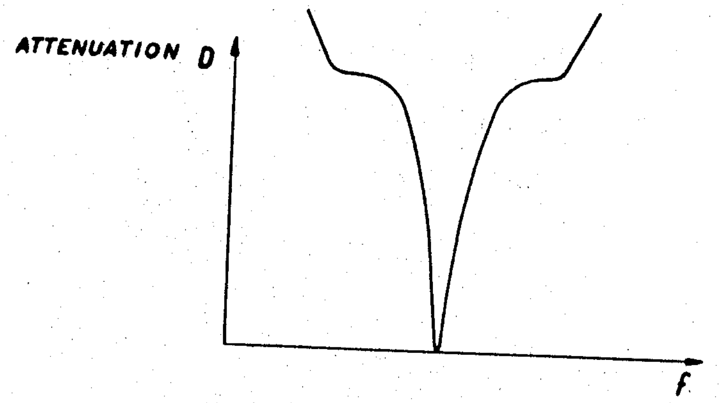

FIGURE 2*c* is a graph of the transmission characteristic curve of the resonator arrangement of FIGURE 2*a*.

Figure 2D:
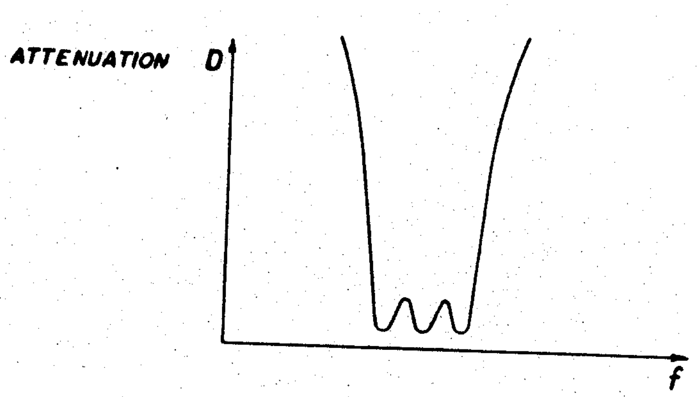

FIGURE 2*d* is a graph of the transmission characteristic curve of a modification of the resonator arrangement of FIGURE 2*a*, wherein the recesses are of a different depth.

Figure 3:
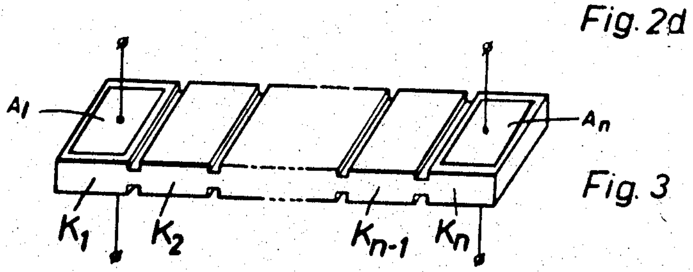

FIGURE 3 is a perspective view of another embodiment according to the present invention.

Figures 4A, 4B:
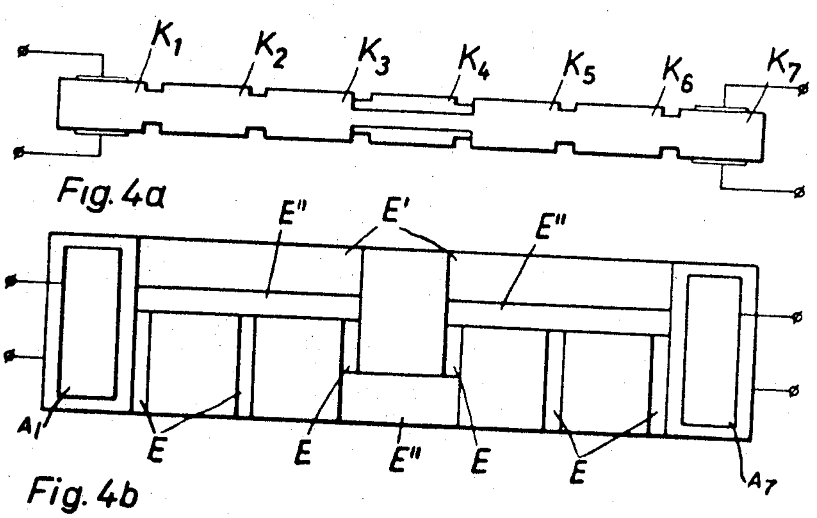

FIGURE 4*a* is a side view of a resonator arrangement having seven crystal regions.

FIGURE 4*b* is a plan view of the resonator arrangement of FIGURE 4*a*.

Figure 4C:
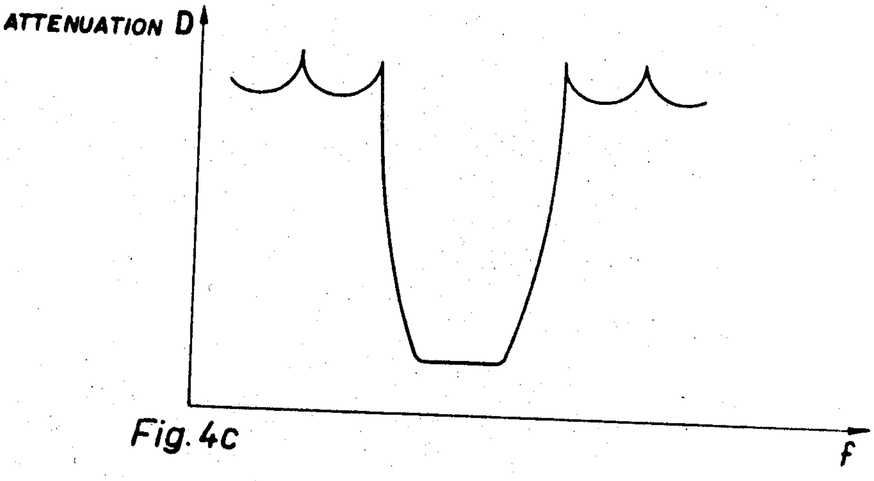

FIGURE 4*c* is a graph of the transmission characteristic curve of the resonator arrangement of FIGURE 4*a*.

Referring now to the drawings, there is shown in FIGURE 1*a* a prior art resonator arrangement comprising a plate-like crystal K having an electrode A provided on the upper and lower face of the crystal with a terminal $\phi$ being connected to each electrode. FIGURE 1*b* shows the electrical equivalent of the resonator arrangement of FIGURE 1*a*, including a capacitor $C_p$ connected in parallel with the series circuit of a capacitor $C_q$ and an inductor L between the terminals $\phi$. Thus, a voltage applied to the electrodes causes an excitation of the crystal into various vibration modes.

As shown in FIGURES 2*a*, there is provided a rectangular quartz plate which is divided into three crystal regions $K_1$, $K_2$ and $K_3$ by recesses $E_1$ and $E_2$. The two outer crystal regions $K_1$ and $K_3$ are provided with electrodes $A_1$ and $A_3$ in the form of electrically conductive surface coatings or thin upper and lower faces. FIGURE 2*b* shows the equivalent circuit diagram for the four-terminal network of FIGURE 2*a*, with $K_1$, $K_2$ and $K_3$ representing the corresponding crystal regions. The crystal regions. The crystal region $K_2$ which actually determines the frequency is coupled to the crystal regions $K_1$ and $K_3$ only by the recesses $E_1$ and $E_2$, these outer regions only serving as the excitation points of the resonator. Therefore, the crystal regions $K_1$ and $K_3$ can be electrically attenuated, for example by the vapor-deposited electrode coatings and can also be detuned mechanically relative to the crystal region $K_2$. Thus, in an arrangement according to the present invention, an alteration of the crystal regions $K_1$ and $K_3$ does not result in a change of the frequency-determining characteristic of the crystal region $K_2$. If the recesses $E_1$ and $E_2$ are sufficiently deep and therefore the capacities $C_1$ and $C_2$ sufficiently high, the transmission characteristic of the four-terminal resonator is controlled by the crystal region $K_2$, which is thereby solely responsible for the frequency stability of an oscillator circuit having the four-terminal resonator connected therein.

FIGURE 2*c* shows the transmission characteristic curve of the resonator arrangement according to FIGURE 2*a*, wherein attenuation D is plotted versus frequency F. The two saddle points in the curve indicate the influence of coupling on the filter characteristic of this in effect crystal, one circuit filter, which coupling is produced by the very weak coupling of the circuit $K_2$ with the circuits $K_1$ and $K_3$.

If the recesses $E_1$ and $E_2$ of the resonator arrangement of FIGURE 2*a* are shallow, all three crystal circuits instead of the circuit $K_2$, can be made effective by a correspondingly stronger coupling between them. The arrangement shown in FIGURE 2*a* then represents a three-circuit filter, whose transmission characteristic curve is shown in FIGURE 2*d*. Such a resonator arrangement is advantageously used as a quartz filter and not as a stabilizing element in an oscillator circuit, because the influence of the circuits $K_1$ and $K_3$ on the transmission characteristics of the entire arrangement is too strong.

Instead of a single crystal region, such as $K_2$ in FIGURE 2*a*, not having electrodes, several such crystal regions may be used, and thus coupling filters having n-circuits may be obtained, such as the arrangement shown schematically in FIGURE 3. In this arrangement, the individual recesses as well as the thickness and the size of the surface of the individual crystal regions can be varied. For example, the thickness can be chosen in such a way that the different crystal regions are excited by different harmonics. Furthermore, in some crystal regions, thickness shear vibrations can be used and in the other crystal regions thickness vibrations. The coupling zones can then function together to produce the desired transmission curve. In this manner, complicated filter arrangements can also be produced.

In FIGURES 4*a* and 4*b*, a coupling filter having seven circuits with varied couplings between adjacent and non-adjacent circuits is shown in side view and in plan view, respectively. The crystal regions $K_1$ to $K_7$ have the same thickness, but are separated from each other by recesses E, E' and E'' of varied depths. The recesses E' serve for the direct coupling of the circuit $K_4$ with $K_1$ and $K_7$. The circuits $K_1$ and $K_7$ at the same time are provided with coatings for the electrical excitation, i.e., electrodes A. The recesses E serve for coupling the adjacent circuits, while the very deep recesses E'' serve for a strong decoupling between the coupling recess E' and the circuits $K_2$ and $K_3$ or $K_5$ and $K_6$, and also for a strong decoupling between the circuits $K_3$ and $K_5$. The direct coupling between the circuits $K_1$ and $K_4$ or $K_4$ and $K_7$ produces in the transmission curve of the arrangement according to the present invention so-called attenuation points, as shown in FIGURE 4*c*.

Thus, in a resonator arrangement according to the present invention, the crystal regions that actually determine the frequency are not provided with electrodes, so that a change of the surface coatings functioning as electrodes, due to the decoupling effected by the zones of different cross section, does not result in a change in the electromechanical characteristics of the entire piezoelectric resonator arrangement.

A particularly advantageous embodiment of the resonator arrangement according to the present invention results when the plate-like crystal resonator is made rectangular and is provided with cross section changes applied transversely to the longitudinal axis of the plate in the form of recesses. Thus, the depth of the recesses can be varied in order to obtain different couplings between the individual crystal regions, and furthermore, additional recesses can be provided parallel to the longitudinal axis of the plate to achieve an even more varied coupling. It is also possible to vary the individual crystal regions in order to provide different plate thicknesses and differently sized plate surfaces. In this arrangement, the same frequency can be approximated in the crystal regions having different thicknesses, by excitation of the regions by different harmonics, which results in a favorable suppression of the interfering side band frequencies. (spurious responses).

It will be noted that the piezoelectric resonator arrangement according to the present invention is not limited to the embodiments shown in the figures, and that various filter structures can be produced.

The resonator arrangements can be produced according to conventional quartz techniques through frequencies exceeding 10 mc. The changes in cross section can be produced wherever desired by applying additional layers or by decreasing the cross section. If the changes in cross section are obtained by providing recesses, these recesses can be produced by a cutting means which, for example, may include an electron or Laser beam or a sand blast beam having beam diameters of less than 0.5 mm. These recesses can, however, also be produced by an etching process wherein the individual crystal regions are coated with a protective layer which is resistant to the etching solution. The zones that separate the individual crystal regions and that have a smaller cross section are not covered with the protective layer, so that the desired recesses are produced when the plate is immersed in the etching solution.

It will be understood that the above description of the present invention is susceptible to various modifications, changes and adaptations, and the same are intended to be comprehended within the meaning and range of equivalents of the appended claims.

We claim:

1. In a piezoelectric resonator arrangement including a plate-like crystal resonator having at least two electrodes provided on each face thereof in the form of electrically conductive surface coatings which are separated from each other by changes in the cross section of the crystal, to define crystal regions, the improvement comprising, in combination:

at least one crystal region without electrodes thereon provided between the crystal regions having electrodes thereon and which are excited for thickness vibrations or thickness shear vibrations; and a plurality of zones having a plate thickness in cross section which differs from the plate thickness of the crystal regions for separating the region without electrodes from the regions with electrodes but which are of the same width as the crystal regions.

2. A piezoelectric resonator arrangement including a plate-like crystal resonator comprising, in combination:

a plurality of zones provided on the faces of said crystal and defining crystal regions having a plate thickness in cross section which differs from the plate thickness of the zones said zones being of the same width as the crystal regions;

electrodes on each face of at least two crystal regions in the form of electrically conductive surface coatings which are separated from each other by said zones; and at least one crystal region without electrodes thereon provided between the crystal regions having said electrodes thereon and separated therefrom by said zones.

3. A piezoelectric resonator arrangement as defined in claim 2 wherein the plate-like crystal resonator is rectangular in form and is provided with a longitudinal axis, and said zones are provided transverse to the longitudinal axis of the crystal plate.

4. A piezoelectric resonator arrangement including a plate-like crystal resonator comprising, in combination:

a plurality of zones provided on the faces of said crystal and defining crystal regions having a plate thickness in cross section which differs from the plate thickness of the zones;

electrodes on each face of at least two crystal regions in the form of electrically conductive surface coatings which are separated from each other by said zones; and at least one crystal region without electrodes thereon provided between the crystal regions having said electrodes thereon and separated therefrom by said zones; the plate-like crystal resonator being rectangular in form and provided with a longitudinal axis, and said zones being provided transverse to the longitudinal axis of the crystal plate, and said zones also being provided parallel to the longitudinal axis of the plate.

5. A piezoelectric resonator arrangement as defined in claim 4 wherein the plate thickness of said zones differ.

6. A piezoelectric resonator arrangement as defined in claim 5 wherein said zones of different cross section are recesses of varied depth.

7. A piezoelectric resonator arrangement as defined in claim 6 wherein the individual crystal regions differ in plate thickness.

8. A piezoelectric resonator arrangement as defined in claim 6 wherein the surface areas of individual crystal regions differ.

9. A piezoelectric resonator as defined in claim 2 where in said regions are of a single layer.

10. A piezoelectric resonator as defined in claim 2 wherein said regions are formed of a plurality of layers which define the difference in thickness.

References Cited

UNITED STATES PATENTS

| | | | |
|---|---|---|---|
| 2,194,539 | 3/1940 | Barry | 333—72 |
| 2,277,709 | 3/1942 | McSkimin | 333—72 |
| 2,373,431 | 4/1945 | Sykes | 333—72 |
| 2,886,787 | 5/1959 | Broadhead | 333—72 |
| 3,051,919 | 8/1962 | Faulk | 333—72 |
| 3,356,850 | 12/1967 | Williams | 310—8.6 |
| 2,276,013 | 3/1942 | Bohannon | 310—8.2 |
| 2,543,500 | 2/1951 | Kettering | 310—8.2 |
| 2,640,879 | 6/1953 | Tournier | 333—72 |
| 2,695,357 | 11/1954 | Donley | 310—8.2 |
| 2,799,789 | 7/1957 | Wolfskill | 310—9 |
| 2,943,279 | 6/1960 | Mattiat | 310—8.2 |
| 3,086,183 | 4/1963 | Schofer | 333—72 |
| 3,015,789 | 1/1962 | Honda | 310—8.2 |
| 3,222,622 | 12/1965 | Curran | 333—72 |
| 3,245,012 | 4/1966 | Schofer | 310—8.5 |
| 3,264,585 | 8/1966 | Poschenrieder | 310—8.2 |

J D MILLER, *Primary Examiner.*

U.S. Cl. X.R.

310—8.5, 9.6; 333—72